(12) United States Patent
Ahuja et al.

(10) Patent No.: US 12,363,449 B2
(45) Date of Patent: Jul. 15, 2025

(54) IMAGE PROCESSING FOR PREVENTING FLICKERING

(71) Applicant: Bank of America Corporation, Charlotte, NC (US)

(72) Inventors: Yogi Ahuja, Warwick, PA (US); Shashi Rao, McKinney, TX (US)

(73) Assignee: Bank of America Corporation, Charlotte, NC (US)

( * ) Notice: Subject to any disclaimer, the term of this patent is extended or adjusted under 35 U.S.C. 154(b) by 204 days.

(21) Appl. No.: 18/126,829

(22) Filed: Mar. 27, 2023

(65) Prior Publication Data

US 2024/0334070 A1     Oct. 3, 2024

(51) Int. Cl.
*H04N 23/745* (2023.01)
*G06T 7/11* (2017.01)
*G09G 5/36* (2006.01)

(52) U.S. Cl.
CPC ............. *H04N 23/745* (2023.01); *G06T 7/11* (2017.01); *G09G 5/36* (2013.01); *G09G 2320/0247* (2013.01)

(58) Field of Classification Search
None
See application file for complete search history.

(56) References Cited

U.S. PATENT DOCUMENTS 7,633,533 B2   12/2009  Cho et al.
10,056,044 B2   8/2018  Yang et al.

FOREIGN PATENT DOCUMENTS

CN         113421189 A  *  9/2021
KR       20240007512 A  *  1/2024

* cited by examiner

*Primary Examiner* — Quan Pham
(74) *Attorney, Agent, or Firm* — Banner & Witcoff, Ltd.

(57) ABSTRACT

An image processing platform may be configured to reduce user interface screen flickering and improve page loading speed. An image processing platform may process images based on determined image complexity. A decision engine may determine the number of image splits and type of parallel processing for an image. The determined image complexity may be based on a determined image complexity score. The system may include machine learning in connection with the decision engine results.

20 Claims, 5 Drawing Sheets

| Nature of Complexity | Image Splits | Type of Parallel Processing ||||| 
|---|---|---|---|---|---|---|
| | | PP(0) | PP(1) | PP(2) | PP(3) | PP(4) |
| Entropy (Pixel density, contrast ration etc.) | | | | | | |
| Low | 0 | ▓ | | | | |
| Moderate | 2 | | | ▓ | | |
| High | 5 | | | | | ▓ |
| Size of Image | | | | | | |
| Low | 0 | ▓ | | | | |
| Moderate | 2 | | | ▓ | | |
| High | 5 | | | | ▓ | |
| Usage on site | | | | | | |
| Low | 0 | ▓ | | | | |
| Moderate | 2 | | | ▓ | | |
| High | 5 | | | | | ▓ |

IMAGE PROCESSING FOR PREVENTING FLICKERING

BACKGROUND

Large enterprise organizations provide many different products and/or services. To support these complex and large-scale operations, a large organization may own, operate, and/or maintain many different computer systems that service different internal users and/or external users in connection with different products and services. Many of these different computer systems have connected user interfaces to display and receive data input from users. Complex images displayed on these user interfaces reduce page load speed and causes user interface screen flickering. This reduced page loading speed and user interface screen flickering is inconvenient for all users and for some users with photosensitivity issues may cause discomfort and/or trigger potential health issues. In addition, reducing user interface screen flickering is consistent with The Americans with Disabilities Act ("ADA") accessibility guidelines and World Wide Web (W3C) criterion and guidelines. As such, a need has been recognized to reduce user interface screen flickering on display devices with heavy image page loading.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer hardware and software. In particular, one or more aspects of the disclosure generally relate to computer hardware and software for optimizing page loading speed while preventing flickering of user interface displays.

An image processing platform may be configured to reduce user interface screen flickering and improve page loading speed. An image processing platform may process images based on determined image complexity. A decision engine may determine the number of image splits and type of parallel processing for an image. The determined image complexity may be based on a determined image complexity score. The system may include machine learning in connection with the decision engine results.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

Computer machines can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Various aspects of this disclosure relate to devices, systems, and methods for processing images to reduce flickering and improve page loading speed. An image processing platform may process images based on determined image complexity. A decision engine may determine the number of image splits and type of parallel processing to be executed on the split images. The determined image complexity may be based on a determined image complexity score. The system may include machine learning in connection with the decision engine results.

Figure 1:
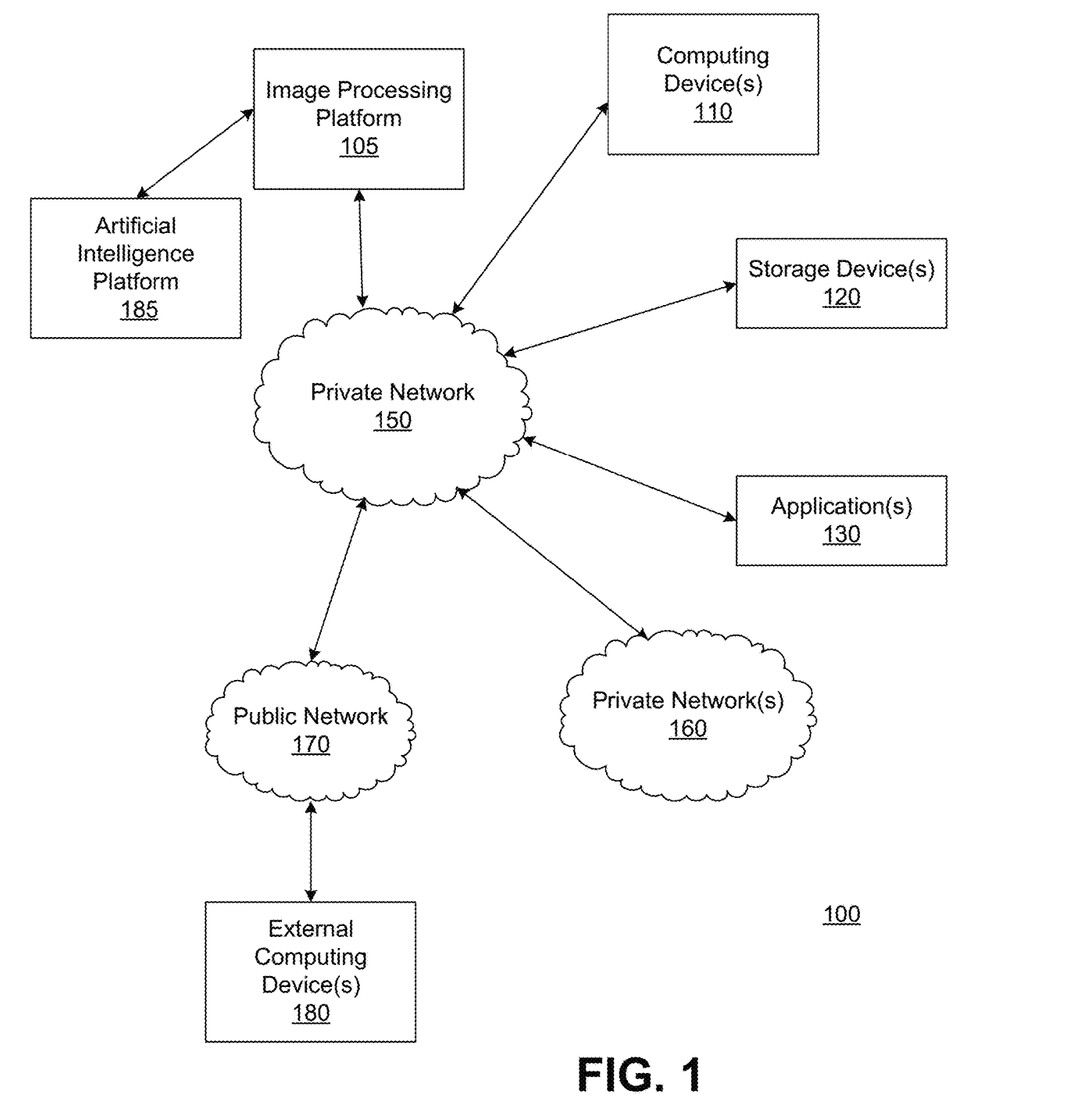
FIG. 1 shows an illustrative computing environment for processing images based on complexity in accordance with one or more aspects described herein.
Figure 2:
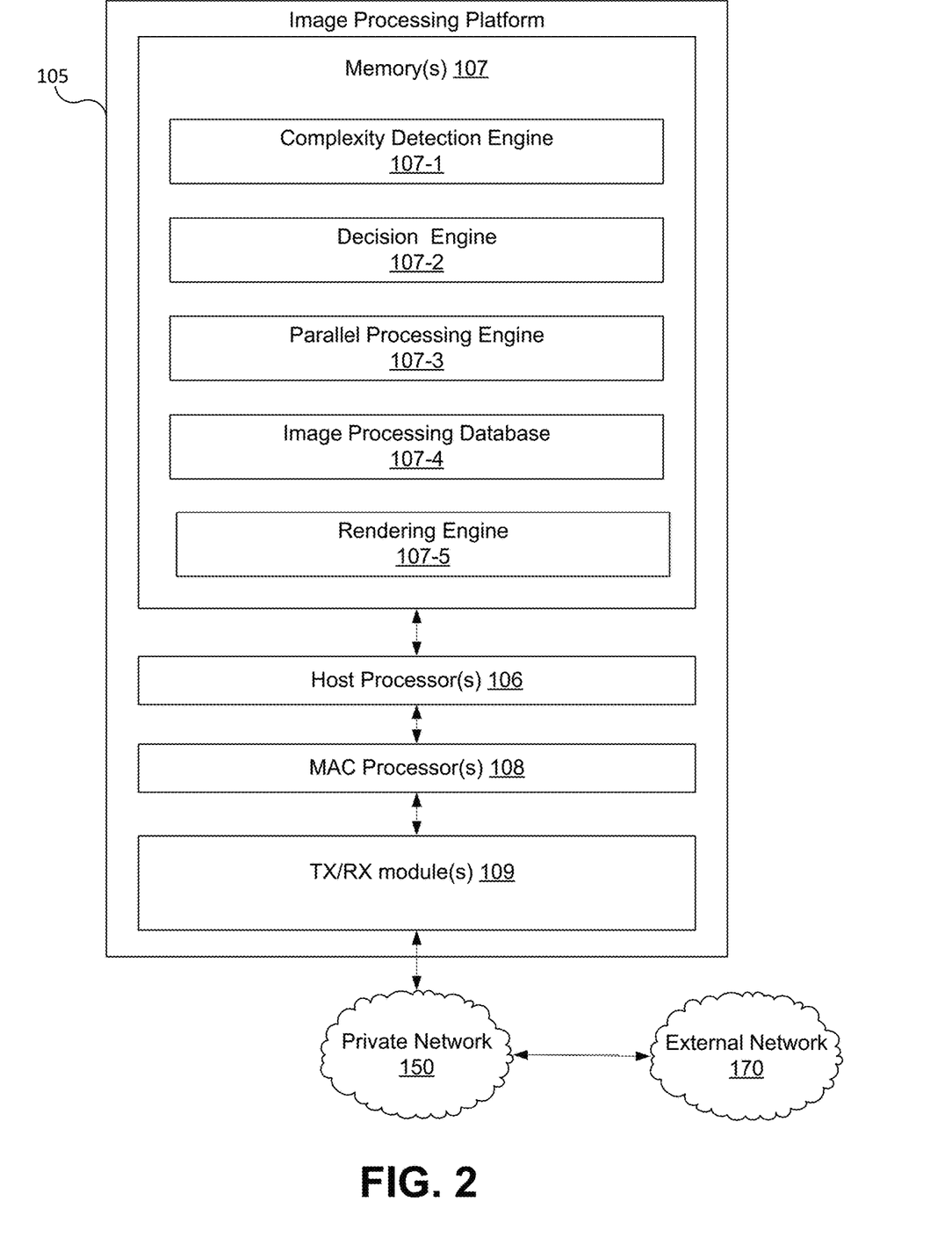
FIG. 2 shows an illustrative image processing platform in accordance with one or more aspects described herein.

FIGS. 1 and 2 depict an illustrative computing environment for image processing in accordance with one or more example arrangements. Referring to FIG. 1, a computing environment 100 may comprise one or more devices (e.g., computer systems, communication devices, servers). The computing environment 100 may comprise, for example, an image processing platform 105, computing device(s) 110, and storage device(s) 120 linked over a private network 150. The storage device(s) 120 may comprise a database, for example, a relational database (e.g., Relational Database Management System (RDBMS), Structured Query Language (SQL), etc.). Application(s) 130 may operate on one or more computing devices or servers associated with the private network 150. The private network 150 may comprise an enterprise private network, for example.

The computing environment 100 may comprise one or more networks (e.g., public networks and/or private networks), which may interconnect with the image processing platform 105, the computing device(s) 110, the storage device(s) 120, and/or one or more other devices and servers. One or more applications 130 may operate on one or more devices in the computing environment. The networks may use wired and/or wireless communication protocols. The private network 150 may be associated with, for example, an enterprise organization. The private network 150 may interconnect the image processing platform 105, the computing device(s) 110, the storage device(s) 120, and/or one or more other devices/servers which may be associated with the enterprise organization. The private network 150 may be linked to other private network(s) 160 and/or a public network 170. The public network 170 may comprise the Internet and/or a cloud network. The private network 150 and the private network(s) 160 may correspond to, for example, a LAN, a WAN, a peer-to-peer network, or the like.

A user in a context of the computing environment 100 may be, for example, an associated user (e.g., an employee, an affiliate, or the like) of the enterprise organization. An external user may utilize services being provided by the enterprise organization, and access one or more resources located within the private network 150 (e.g., via the public network 170). Users may operate one or more devices in the computing environment 100 to send messages to and/or receive messages from one or more other devices connected to the computing environment 100. An enterprise organization may correspond to any government or private institution, an educational institution, a financial institution, health services provider, retailer, or the like.

As illustrated in greater detail below, the image processing platform 105 may comprise one or more computing devices configured to perform one or more of the functions described herein. The image processing platform 105 may comprise, for example, one or more computers (e.g., laptop computers, desktop computers, servers, server blades, or the like).

The computing device(s) 110 may comprise one or more of enterprise application host platforms, an enterprise user computing device, an administrator computing device, and/or other computing devices, platforms, and servers associated with the private network 150. The enterprise application host platform(s) may comprise one or more computing devices and/or other computer components (e.g., processors, memories, communication interfaces). The enterprise application host platform may be configured to host, execute, and/or otherwise provide one or more enterprise applications. The enterprise application host platform(s) may be configured, for example, to host, execute, and/or otherwise provide one or more transaction processing programs, user servicing programs, and/or other programs associated with an enterprise organization. The enterprise application host platform(s) may be configured to provide various enterprise and/or back-office computing functions for an enterprise organization. The enterprise application host platform(s) may comprise various servers and/or databases that store and/or otherwise maintain account information, such as financial/membership account information including account balances, transaction history, account owner information, and/or other information corresponding to one or more users (e.g., external users). The enterprise application host platform(s) may process and/or otherwise execute transactions on specific accounts based on commands and/or other information received from other computer systems comprising the computing environment 100. The enterprise application host platform(s) may transmit and receive data from the image processing platform 105, and/or to other computer systems in the computing environment 100.

The application(s) 130 may comprise transaction processing programs, user servicing programs, and/or other programs associated with an enterprise organization. The application(s) 130 may correspond to applications that provide various enterprise and/or back-office computing functions for an enterprise organization. The application(s) 130 may correspond to applications that facilitate storage, modification, and/or maintenance of account information, such as financial/membership account information including account balances, transaction history, account owner information, and/or other information corresponding to one or more users (e.g., external users). The application(s) 130 may process and/or otherwise execute transactions on specific accounts based on commands and/or other information received from other computer systems comprising the computing environment 100. The application(s) 130 may operate in a distributed manner across multiple computing devices (e.g., the computing device(s) 110) and/or servers, operate on a single computing device and/or server. The application(s) 130 may be used for execution of various operations corresponding to the one or more computing devices (e.g., the computing device(s) 110) and/or servers.

The storage device(s) 120 may comprise various memory devices such as hard disk drives, solid state drives, magnetic tape drives, or other electronically readable memory, and/or the like. The storage device(s) 120 may be used to store data corresponding to operation of one or more applications within the private network 150 (e.g., the application(s) 130), and/or computing devices (e.g., the computing device(s) 110). The storage device(s) 120 may receive data from the image processing platform 105, store the data, and/or transmit the data to the image processing 105 and/or to other computing systems in the computing environment 100.

The architecture of the private network(s) 160 may be similar to an architecture of the private network 150. The private network(s) 160 may correspond to, for example, another enterprise organization that communicates data with the private network 150. The private network 150 may also be linked to the public network 170. The public network 170 may comprise the external computing device(s) 180. The external computer device(s) 180 may include at least one computing device (e.g., desktop computer, laptop computer) or mobile computing device (e.g., smartphone, tablet). The external computer device(s) 180 may be linked to and/or operated by a user (e.g., a client, an affiliate, or an employee) of an enterprise organization associated with the private network 150. The user may interact with one or more enterprise resources while using the external computing device(s) 180 located outside of an enterprise firewall.

The image processing platform 105, the computing device(s) 110, the external computing device(s) 180, and/or one or more other systems/devices in the computing environment 100 may comprise any type of computing device capable of receiving input via a user interface, and may communicate the received input to one or more other computing devices. The image processing platform 105, the computing device(s) 110, the external computing device(s) 180, and/or the other systems/devices in the computing environment 100 may, in some instances, comprise server computers, desktop computers, laptop computers, tablet computers, smart phones, wearable devices, finger print readers, entryway scanners, or the like that in turn comprise one or more processors, memories, communication interfaces, storage devices, and/or other components. Any and/or all of the image processing platform 105, the computing device(s) 110, the storage device(s) 120, and/or other systems/devices in the computing environment 100 may be, in some instances, special-purpose computing devices configured to perform specific functions.

In some embodiments, artificial intelligence or machine learning may be used with image processing platform 105. As shown if FIG. 1, image processing platform 105 may directly communicate and work with artificial intelligence platform 185. In some instances, artificial intelligence platform 185 may comprise a Long Short-Term Memory (LSTM) neural network that may be used to monitor current and past image processing of images. In other instances, deep scanning may be used to analyze history and frequency of particular images being processed. The use of machine learning and the analysis of image processing history may speed up processing, increase page loading speed, and reduce overall user interface flickering.

Referring to FIG. 2, the image processing platform 105 may comprise one or more of host processor(s) 106, memory 107, medium access control (MAC) processor(s) 108, transmit/receive (TX/RX) module(s) 109, or the like. One or more data buses may interconnect host processor(s) 106, memory 107, MAC processor(s) 108, and/or TX/RX module(s) 109. The image processing platform 105 may be implemented using one or more integrated circuits (ICs), software, or a combination thereof, configured to operate as discussed below. The host processor(s) 106 and the MAC processor(s) 108 may be implemented, at least partially, on a single IC or multiple ICs. Memory 107 may be any memory such as a random-access memory (RAM), a read-only memory (ROM), a flash memory, or any other electronically readable memory, or the like.

One or more processors (e.g., the host processor(s) 106, the MAC processor(s) 108, and/or the like) of the image processing platform 105 may be configured to execute machine readable instructions stored in memory 107. Memory 107 may comprise (i) one or more program modules/engines having instructions that when executed by the one or more processors cause the image processing platform 105 to perform one or more functions described herein, and/or (ii) one or more databases that may store and/or otherwise maintain information which may be used by the one or more program modules/engines and/or the one or more processors. The one or more program modules/engines and/or databases may be stored by and/or maintained in different memory units of the image processing platform 105 and/or by different computing devices that may form and/or otherwise make up the image processing platform 105. For example, memory 107 may have, store, and/or comprise a complexity detection engine 107-1, decision engine 107-2, parallel processing engine 107-3, and image processing database 107-4. The decision engine 107-2 may comprise instructions that direct and/or cause the image processing platform 105 to perform one or more operations, as discussed in greater detail below. The image processing database 107-4 may comprise a SQL database, an Oracle database, or another relational database, for example. The image processing database 107-4 may store information to be used for performing additional image processing by image processing platform 105.

While FIG. 2 illustrates the image processing platform 105 as being separate from other elements connected in the private network 150, in one or more other arrangements, the image processing platform 105 may be included in one or more of the computing device(s) 110, and/or other device/servers associated with the private network 150. Elements in the image processing platform 105 (e.g., host processor(s) 106, memory(s) 107, MAC processor(s) 108, and TX/RX module(s) 109, one or more program modules and/or stored in memory(s) 107) may share hardware and/or software elements with and corresponding to, for example, one or more of the computing device(s) 110, and/or other devices/servers associated with the private network 150.

Figure 3:
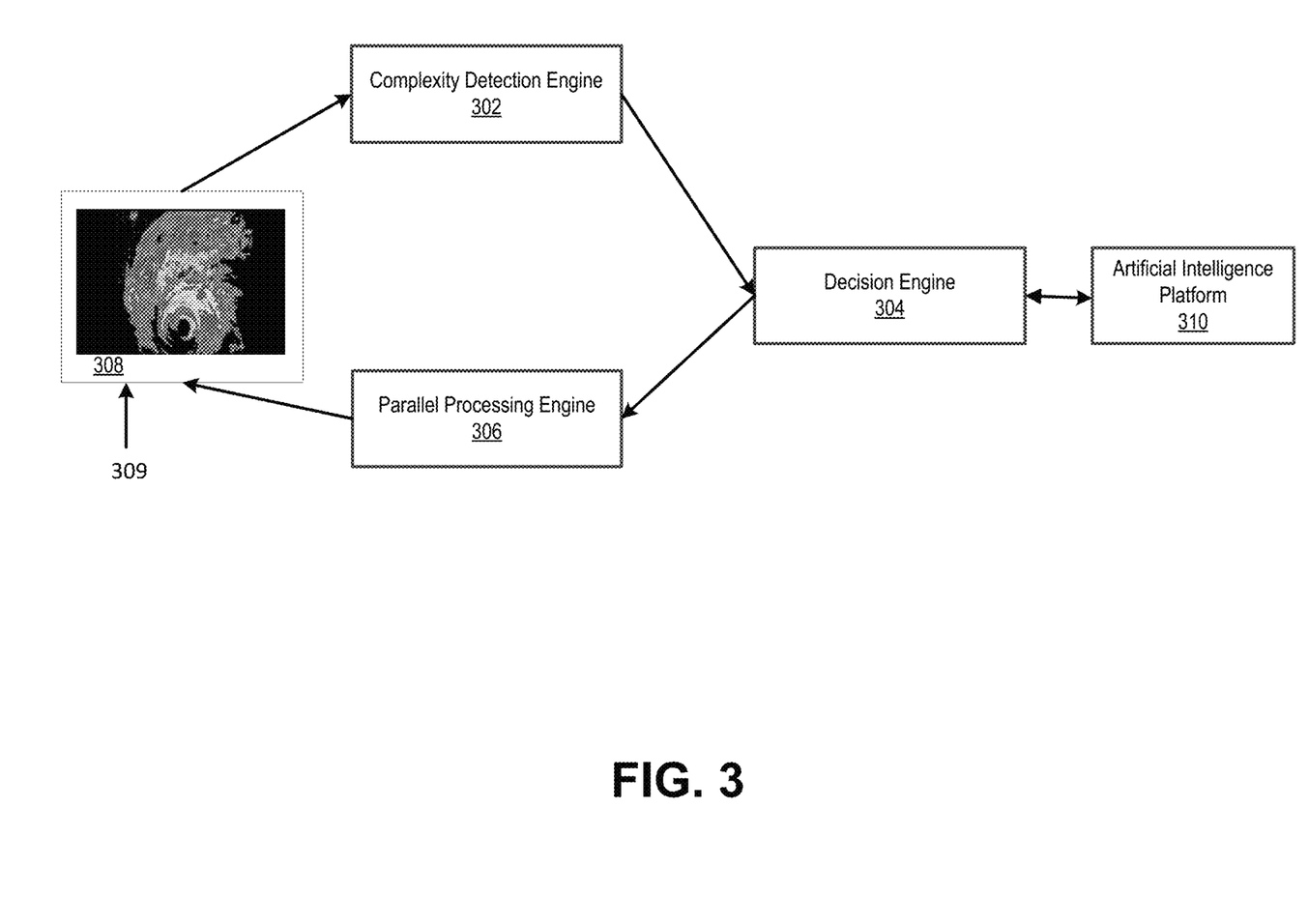
FIG. 3 shows an illustrative flow diagram of a computing environment for processing images in accordance with one or more example arrangements described herein.
Figure 4:
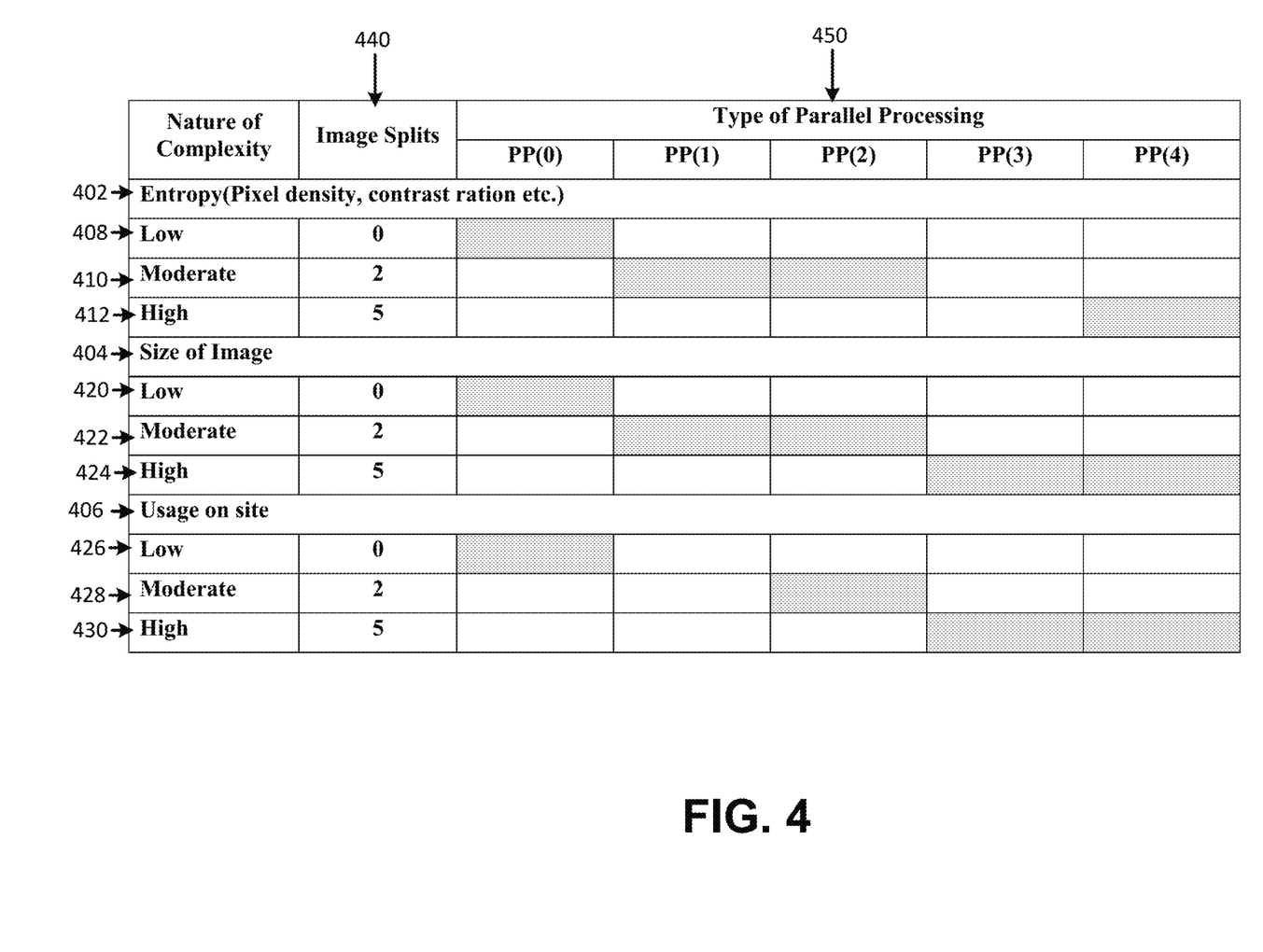
FIG. 4 shows an illustrative table illustrating factors for determining complexity of images in accordance with one or more aspects described herein.

FIG. 3 shows an illustrative flow diagram of a computing environment for image processing in accordance with one or more aspects of the disclosure. In FIG. 3, complexity detection engine 302 determines an image complexity score for content to be rendered onto a user interface screen. FIG. 4 illustrates a number of factors complexity detection engine 302 may utilize in determining nature of complexity of a selected image.

Complexity detection engine 302 determines the complexity of an image based on a number of complexity factors that may include entropy 402, size of image 404, and usage on site 406. Those skilled in the art will realize that numerous additional complexity criteria may be used to determine the complexity of an image. For instance, complexity criteria may also include determination of color combinations used in an image. Different color combinations used in an image may be easier to process than other color combinations.

In an aspect of the disclosure, entropy 402 of an image may include the pixel density and contrast ratio along with other parameters. In an embodiment, the entropy 402 of an image may be determined to be low 408, moderate, 410, or high 412 by complexity detection engine 302.

In an aspect of the disclosure, size of image 404 may be determined to be low 420 (below 500 kb), moderate 422 (above 500 kb but below 2 Mb), or high (above 2 Mb). Those skilled in the art will realize that other ranges may be used based on the type of images being processed and those different ranges fall within the scope of the current disclosure.

In yet another aspect of the disclosure, the number of times an image is used on a site 406 may also be a factor in determining image complexity. For instance, some images may be used as background in other images and may be shown in numerous instances on single user interface rendering. In an embodiment, usage on a site of an image may be categorized into low 426, moderate 428, or high 430.

Complexity detection engine 302 may combine the determined subscores of each of the complexity factors to determine an overall complexity score for the image. In an embodiment, the total complexity score for an image may range numerically from one to ten and be stored in image processing database 107-4.

As illustrated in FIG. 3, decision engine 304 based on the generated complexity detection engine's score may determine a number of partitions for an image along with a parallel processing type. FIG. 4 illustrates an exemplary number of image splits 440 and the types of parallel processing 450 that may be determined for use by decision engine 304 for various complex images.

In an aspect of the disclosure, artificial intelligence platform 310 may determine that based on certain criteria a different number of image splits or parallel processing type may be more beneficial to be used based on learnings from earlier decision engine 304 determinations. Artificial intelligence platform 310 and decision engine 304 may be based on discovered learnings determine best outcomes for image processing of various images having similar complexity attributes. These learnings may be implemented to improve page loading speed while reducing user interface flickering. In addition, in situations where two types parallel processing types may be selected based on a determined complexity score, artificial intelligence platform 310 learnings may be utilized to select the parallel processing type with the highest probability of having the best outcome for page loading speed and reduced user interface flickering.

In an aspect of the disclosure, artificial intelligence platform 310 may store and review page loading speeds of images using different determined number of partitions and parallel processing types. Such information may be used to determine future image splits and parallel processing types.

As further illustrated in FIG. 3, parallel processing engine 306 may process the determined parallel processing type to render via rendering engine 107-5 the image 308 without flickering on the user interface display 309 with an acceptable page loading speed. In an aspect of the disclosure, when an update to an image is made or requested the image processing technique of the present disclosure begins again and proceeds through the image processing engines 302, 304, and 306 discussed above to render an updated image on the user interface display 309.

Figure 5:
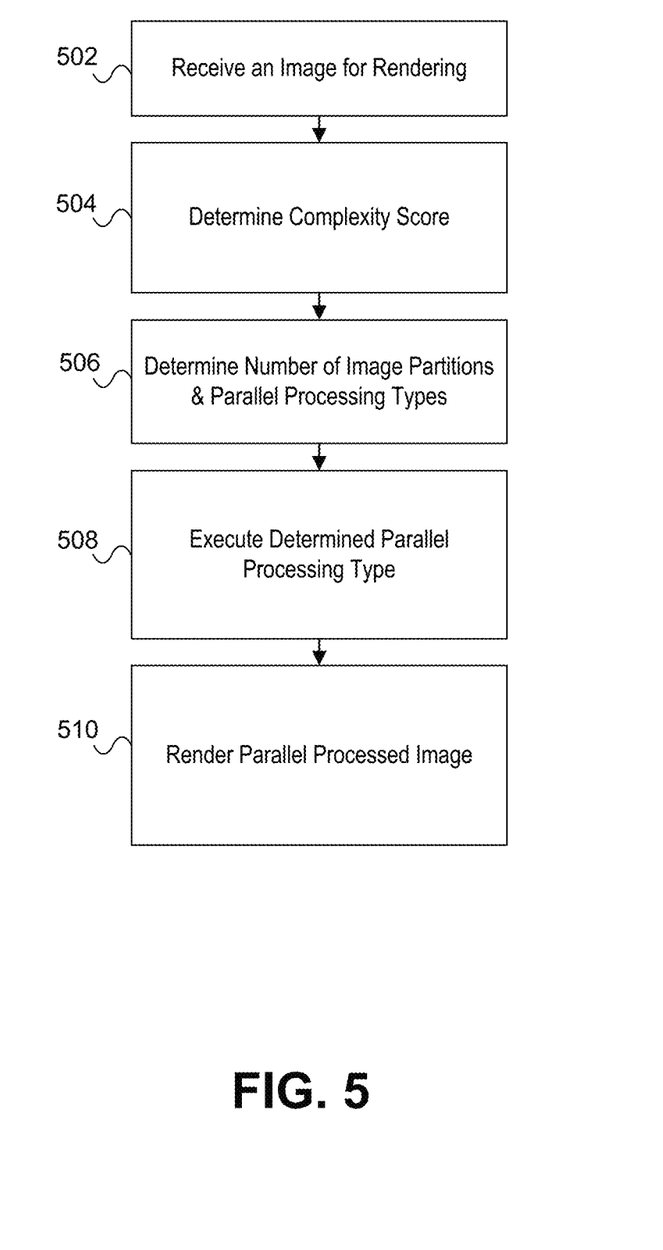
FIG. 5 shows a method of image processing in accordance with one or more aspects of the disclosure.

FIG. 5 shows a method of image processing in accordance with one or more aspects of the disclosure. In FIG. 5 at step 502, an image is received that is to be rendered on user interface display 309. In step 504, complexity detection engine 302 determines a complexity score for the image. In step 506, decision engine 304 determines the number of partitions the image should be segmented into for processing. Additionally, decision engine 304 determines the type of parallel processing to be performed on the image partitions based at least in part on the determined complexity score. In step 508, parallel processing engine 306 executes the determined parallel processing type. In step 510, the processed image is rendered on user interface display 309.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A method for processing an image to reduce user interface flickering and improve page loading speed, the method comprising:

receiving, an image processing platform, an image to be rendered on a user interface display;

determining, a complexity detection engine of the image processing platform, a complexity score for the received image based on complexity factors including an entropy of the received image, a size of the received image, and a frequency of usage of the received image on a site;

determining, a decision engine of the image processing platform, a number of partitions for the received image and a type of parallel processing to be performed on the received image based at least in part on the complexity score;

executing, a parallel processing engine of the image processing platform, the determined type of parallel processing on the received image to generate a processed image;

rendering, a rendering engine of the image processing platform, the processed image on the user interface display with reduced flickering and improved page loading speed;

storing, the image processing platform, the complexity score in an image processing database communicatively linked to the image processing platform;

analyzing, an artificial intelligence platform operatively connected to the image processing platform, past determinations of numbers of partitions and types of parallel processing stored in the image processing database to determine a preferred number of partitions and a preferred type of parallel processing for images having similar complexity scores;

updating, the decision engine, the number of partitions and the type of parallel processing for a subsequent image based on the analysis by the artificial intelligence platform; and processing, the image processing platform, the subsequent image using the updated number of partitions and the updated type of parallel processing to render the subsequent image on the user interface display.

2. The method of claim 1, further comprising:

receiving, the image processing platform, an updated image to be rendered on the user interface display when an update to the received image is made; and repeating, the image processing platform, the determining by the complexity detection engine, the determining by the decision engine, the executing by the parallel processing engine, and the rendering by the rendering engine for the updated image.

3. The method of claim 2, wherein determining the complexity score for the received image includes:

calculating, the complexity detection engine, an entropy subscore based on a pixel density and a contrast ratio of the received image;

calculating, the complexity detection engine, a size subscore based on a file size of the received image;

calculating, the complexity detection engine, a usage subscore based on a number of times the received image is used on the site; and combining, the complexity detection engine, the entropy subscore, the size subscore, and the usage subscore to generate the complexity score.

4. The method of claim 3, further comprising:

categorizing, the complexity detection engine, the entropy subscore as low, moderate, or high based on predetermined entropy ranges;

categorizing, the complexity detection engine, the size subscore as low, moderate, or high based on predetermined size ranges including below 500 kilobytes, between 500 kilobytes and 2 megabytes, and above 2 megabytes; and categorizing, the complexity detection engine, the usage subscore as low, moderate, or high based on predetermined usage frequency ranges.

5. The method of claim 4, wherein the image processing platform operates over a private network interconnecting the image processing platform, the image processing database, and the artificial intelligence platform.

6. The method of claim 5, further comprising facilitating, a network interface of the image processing platform, communication between the image processing platform and an external computing device over a public network to receive the image from the external computing device.

7. The method of claim 6, wherein the artificial intelligence platform includes a Long Short-Term Memory neural network configured to monitor current and past image processing to determine the preferred number of partitions and the preferred type of parallel processing.

8. The method of claim 7, further comprising storing, the image processing platform, page loading speeds of the processed image and the subsequent image in the image processing database for use by the artificial intelligence platform in determining the preferred number of partitions and the preferred type of parallel processing.

9. The method of claim 8, wherein rendering the processed image on the user interface display ensures compliance with accessibility standards by minimizing flickering to accommodate users with photosensitivity consistent with Americans with Disabilities Act guidelines.

10. A method for processing an image to reduce user interface flickering and improve page loading speed within a computing environment of an enterprise organization, the method comprising:

receiving, an image processing platform including at least one host processor, a memory, a medium access control processor, and a transmit/receive module, an image to be rendered on a user interface display associated with a computing device of the enterprise organization;

determining, a complexity detection engine stored in the memory of the image processing platform, a complexity score for the received image based on complexity factors including an entropy of the received image, a size of the received image, and a frequency of usage of the received image on a site by:

calculating, the complexity detection engine, an entropy subscore based on a pixel density and a contrast ratio of the received image;

calculating, the complexity detection engine, a size subscore based on a file size of the received image;

calculating, the complexity detection engine, a usage subscore based on a number of times the received image is used on the site including instances where the received image is used as a background in other images;

categorizing, the complexity detection engine, the entropy subscore as low, moderate, or high based on predetermined entropy ranges;

categorizing, the complexity detection engine, the size subscore as low, moderate, or high based on predetermined size ranges including below 500 kilobytes, between 500 kilobytes and 2 megabytes, and above 2 megabytes;

categorizing, the complexity detection engine, the usage subscore as low, moderate, or high based on predetermined usage frequency ranges; and combining, the complexity detection engine, the entropy subscore, the size subscore, and the usage subscore to generate the complexity score as a numerical value ranging from one to ten;

determining, a decision engine stored in the memory of the image processing platform, a number of partitions for the received image and a type of parallel processing to be performed on the received image based at least in part on the complexity score;

executing, a parallel processing engine stored in the memory of the image processing platform, the determined type of parallel processing on the received image to generate a processed image;

rendering, a rendering engine stored in the memory of the image processing platform, the processed image on the user interface display with reduced flickering and improved page loading speed, ensuring compliance with accessibility standards by minimizing flickering to accommodate users with photosensitivity consistent with Americans with Disabilities Act guidelines;

storing, the image processing platform, the complexity score and page loading speeds of the processed image in an image processing database communicatively linked to the image processing platform via a data bus, wherein the image processing database includes a relational database structure;

analyzing, an artificial intelligence platform operatively connected to the image processing platform and including a Long Short-Term Memory neural network, past determinations of numbers of partitions and types of parallel processing stored in the image processing database to determine a preferred number of partitions and a preferred type of parallel processing for images having similar complexity scores;

monitoring, the artificial intelligence platform, current and past image processing including a history and frequency of images processed to refine the preferred number of partitions and the preferred type of parallel processing;

updating, the decision engine, the number of partitions and the type of parallel processing for a subsequent image based on the analysis by the artificial intelligence platform;

processing, the image processing platform, the subsequent image using the updated number of partitions and the updated type of parallel processing to render the subsequent image on the user interface display;

receiving, the image processing platform, an updated image to be rendered on the user interface display when an update to the received image is made or requested by a user of the enterprise organization;

repeating, the image processing platform, the determining by the complexity detection engine, the determining by the decision engine, the executing by the parallel processing engine, and the rendering by the rendering engine for the updated image;

operating, the image processing platform, over a private network interconnecting the image processing platform, the image processing database, and the artificial intelligence platform within the computing environment of the enterprise organization;

facilitating, a network interface implemented by the transmit/receive module of the image processing platform, communication between the image processing platform and an external computing device operated by an external user over a public network including the Internet to receive the image from the external computing device; and coordinating, the at least one host processor and the memory of the image processing platform, distributed execution of the determining by the complexity detection engine, the determining by the decision engine, the executing by the parallel processing engine, and the rendering by the rendering engine across multiple computing devices including enterprise application host platforms to dynamically adapt to varying image processing demands of the enterprise organization.

11. A system for processing an image to reduce user interface flickering and improve page loading speed, the system comprising:

an image processing platform configured to receive an image to be rendered on a user interface display;

a complexity detection engine of the image processing platform configured to determine a complexity score for the received image based on complexity factors including an entropy of the received image, a size of the received image, and a frequency of usage of the received image on a site;

a decision engine of the image processing platform configured to determine a number of partitions for the received image and a type of parallel processing to be performed on the received image based at least in part on the complexity score;

a parallel processing engine of the image processing platform configured to execute the determined type of parallel processing on the received image to generate a processed image;

a rendering engine of the image processing platform configured to render the processed image on the user interface display with reduced flickering and improved page loading speed;

an image processing database communicatively linked to the image processing platform configured to store the complexity score;

an artificial intelligence platform operatively connected to the image processing platform configured to analyze past determinations of numbers of partitions and types of parallel processing stored in the image processing database to determine a preferred number of partitions and a preferred type of parallel processing for images having similar complexity scores; and the decision engine further configured to update the number of partitions and the type of parallel processing for a subsequent image based on the analysis by the artificial intelligence platform, wherein the image processing platform is further configured to process the subsequent image using the updated number of partitions and the updated type of parallel processing to render the subsequent image on the user interface display.

12. The system of claim 11, wherein the image processing platform is further configured to receive an updated image to be rendered on the user interface display when an update to the received image is made, and wherein the complexity detection engine, the decision engine, the parallel processing engine, and the rendering engine are configured to process the updated image to render the updated image on the user interface display.

13. The system of claim 12, wherein the complexity detection engine is configured to determine the complexity score by calculating an entropy subscore based on a pixel density and a contrast ratio of the received image, calculating a size subscore based on a file size of the received image, calculating a usage subscore based on a number of times the received image is used on the site, and combining the entropy subscore, the size subscore, and the usage subscore to generate the complexity score.

14. The system of claim 13, wherein the complexity detection engine is further configured to categorize the entropy subscore as low, moderate, or high based on predetermined entropy ranges, categorize the size subscore as low, moderate, or high based on predetermined size ranges including below 500 kilobytes, between 500 kilobytes and 2 megabytes, and above 2 megabytes, and categorize the usage subscore as low, moderate, or high based on predetermined usage frequency ranges.

15. The system of claim 14, further comprising a private network configured to interconnect the image processing platform, the image processing database, and the artificial intelligence platform.

16. The system of claim 15, further comprising a network interface of the image processing platform configured to facilitate communication between the image processing platform and an external computing device over a public network to receive the image from the external computing device.

17. The system of claim 16, wherein the artificial intelligence platform includes a Long Short-Term Memory neural network configured to monitor current and past image processing to determine the preferred number of partitions and the preferred type of parallel processing.

18. The system of claim 17, wherein the image processing platform is further configured to store page loading speeds of the processed image and the subsequent image in the image processing database, and wherein the artificial intelligence platform is configured to use the stored page loading speeds to determine the preferred number of partitions and the preferred type of parallel processing.

19. The system of claim 18, wherein:
the image processing platform includes at least one host processor, a memory, a medium access control processor, and a transmit/receive module, wherein the memory is configured to store the complexity detection engine, the decision engine, the parallel processing engine, and the rendering engine, and wherein the at least one host processor and the memory are configured to coordinate distributed execution of the complexity detection engine, the decision engine, the parallel processing engine, and the rendering engine across multiple computing devices including enterprise application host platforms to dynamically adapt to varying image processing demands of an enterprise organization;
the complexity detection engine is configured to determine the complexity score as a numerical value ranging from one to ten by calculating the entropy subscore based on the pixel density and the contrast ratio of the received image, calculating the size subscore based on the file size of the received image, calculating the usage subscore based on the number of times the received image is used on the site including instances where the received image is used as a background in other images, and combining the entropy subscore, the size subscore, and the usage subscore;
the image processing database includes a relational database structure configured to store the complexity score and the page loading speeds of the processed image, the subsequent image, and the updated image;
the artificial intelligence platform is configured to monitor a history and frequency of images processed to refine the preferred number of partitions and the preferred type of parallel processing;
the rendering engine is configured to ensure compliance with accessibility standards by minimizing flickering on the user interface display to accommodate users with photosensitivity consistent with Americans with Disabilities Act guidelines;
the private network is configured to interconnect the image processing platform, the image processing database, and the artificial intelligence platform within a computing environment of the enterprise organization; and
the network interface is implemented by the transmit/receive module and is configured to facilitate communication over the public network including the Internet with the external computing device operated by an external user to receive the image, the subsequent image, and the updated image when the update to the received image is made or requested by a user of the enterprise organization.

20. The system of claim 19, wherein the rendering engine is further configured to ensure compliance with accessibility standards consistent with World Wide Web Consortium guidelines by minimizing flickering on the user interface display.

* * * * *